No. 873,283. PATENTED DEC. 10, 1907.
J. WOLFENDEN, J. KNUTSON & L. LARSEN.
COLLAPSIBLE GO-CART.
APPLICATION FILED FEB. 23, 1907.
2 SHEETS—SHEET 1.
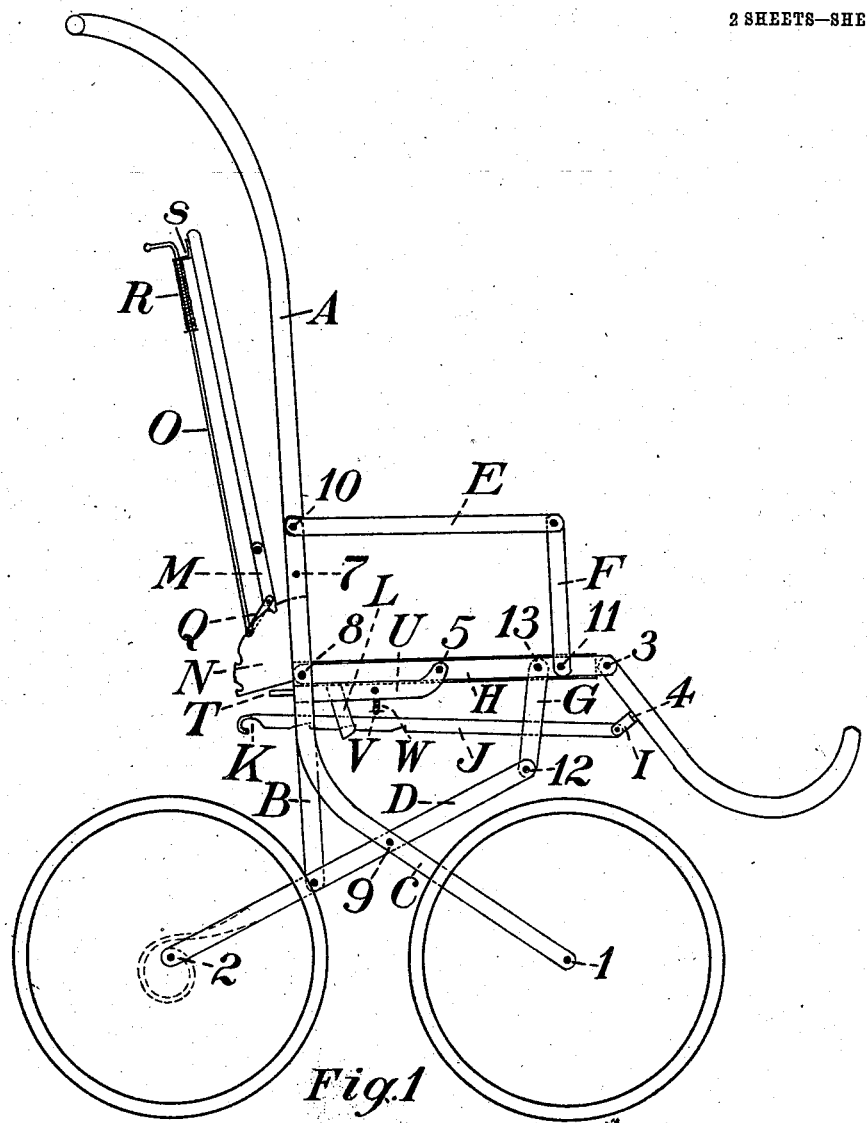
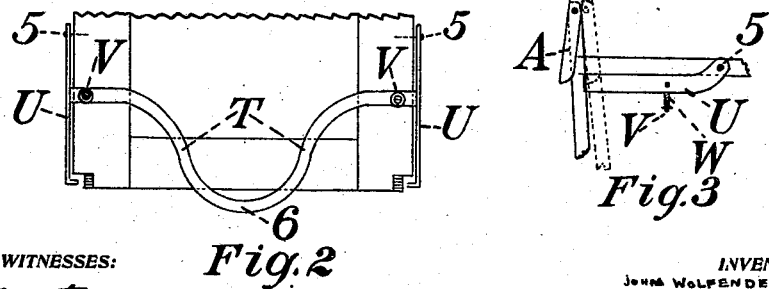
WITNESSES:
INVENTORS
John WOLFENDEN
John KNUTSON
LEWIS LARSEN
BY
ATTORNEY No. 873,283.                                                  PATENTED DEC. 10, 1907.
J. WOLFENDEN, J. KNUTSON & L. LARSEN.
COLLAPSIBLE GO-CART.
APPLICATION FILED FEB. 23, 1907.

2 SHEETS—SHEET 2.

WITNESSES:

INVENTORS
JOHN WOLFENDEN
JOHN KNUTSON
LEWIS LARSEN
BY
ATTORNEY

UNITED STATES PATENT OFFICE.

JOHN WOLFENDEN, OF MINNEAPOLIS, MINNESOTA, AND JOHN KNUTSON AND LEWIS LARSEN, OF MENOMINEE, MICHIGAN, ASSIGNORS, BY DIRECT AND MESNE ASSIGNMENTS, TO HARRIS ARONSON AND MEYERS ROSENSTEIN, OF ST. PAUL, MINNESOTA.

COLLAPSIBLE GO-CART.

No. 873,283.        Specification of Letters Patent.        Patented Dec. 10, 1907.

Application filed February 23, 1907. Serial No. 359,028.

*To all whom it may concern:*

Be it known that we, JOHN WOLFENDEN, a citizen of the United States, residing at 2232 Pierce street northeast, in the city of Minneapolis, in the county of Hennepin and State of Minnesota, and JOHN KNUTSON, a citizen of the United States, residing at 2316 Broadway street, in the city of Menominee, in the county of Menominee and State of Michigan, and LEWIS LARSEN, a citizen of the United States, residing at 2713 Broadway street, in the city of Menominee, in the county of Menominee and State of Michigan, have invented a new and useful Collapsible Go-Cart or Baby-Carriage, of which the following is a specification.

Figure 4:
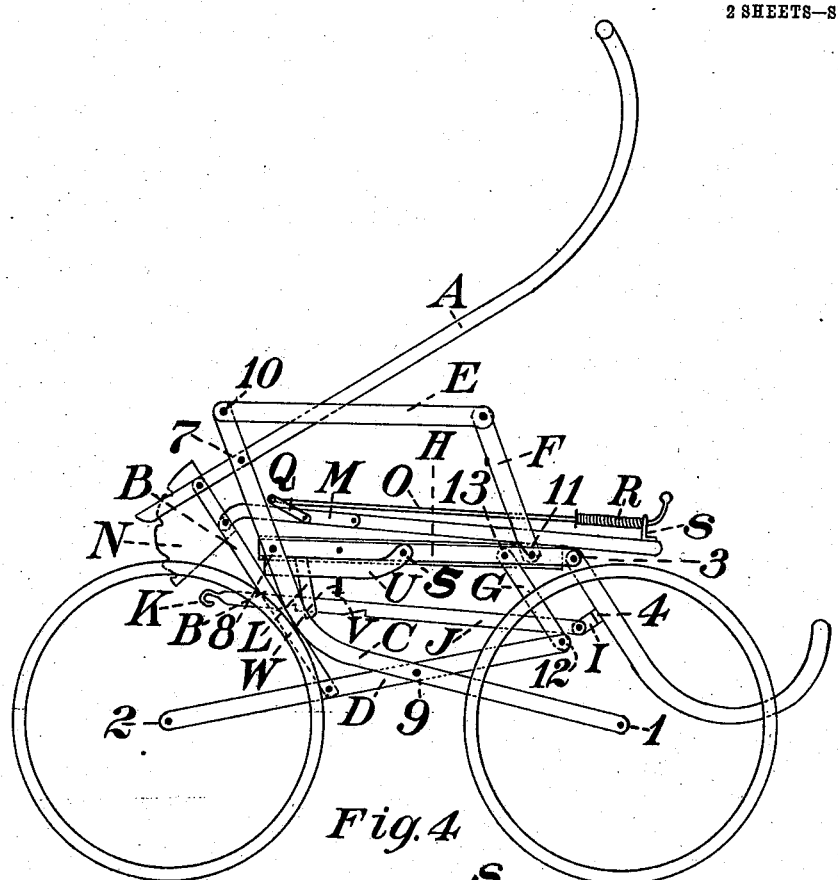
Figure 5:
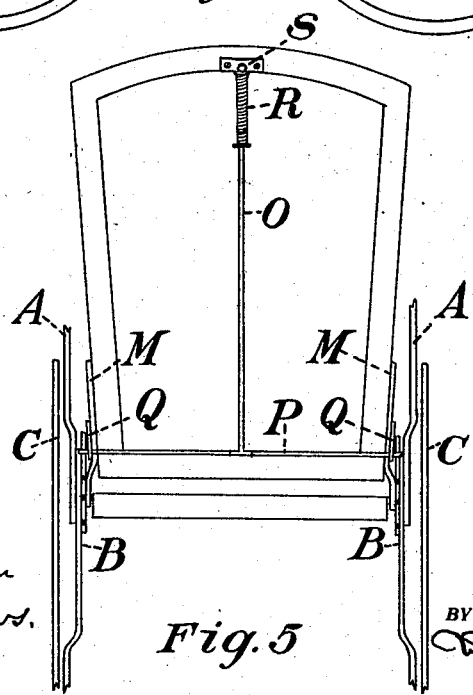

Our invention relates to go-carts or baby carriages and the objects of our invention is to provide a solid, substantial go-cart or baby carriage which can be rapidly and easily folded and collapsed in to a comparatively small space and at the same time be easily carried and which when folded or collapsed will stand alone, and which after being collapsed can be rapidly and easily set up and also to provide a collapsible cart which will have an adjustable back and foot rest. Also to provide a go-cart or baby carriage which may be collapsed so as to form a bed. We attain these objects by the mechanism illustrated in the accompanying drawing in which Figure 1 shows a side view of one side of the mechanism of the cart complete when the cart is set up and ready for use. Fig. 2 is a partial view of the bottom of the seat of the cart, showing the construction of the locking device and springs by which the framework of the cart is held in place when the cart is set up and by means of which the framework of the cart is released and allowed to collapse. Fig. 3 is a side view of another portion of said locking device. Fig. 4 shows a side view of one side of the mechanism of the cart complete, when the cart is partly collapsed or folded. Fig. 5 shows a view of the back of the cart including a portion of the rear view of the framework of the cart.

Similar letters refer to similar parts throughout the several drawings.

So far as concerns the lowering or collapsing mechanism of the cart, the framework consists on each side of the bars; A, B, C, D, E, F, G and H. Numbers 1 and 2 indicate where the framework is fastened to the front and back axles.

The seat of the cart is placed between the two side bars H, and is held in place by two or more wood or lag screws placed through each bar H, and going into the framework of the seat. Each of the ornamental sides of the cart is fastened by two or more wood or lag screws passing through one of the bars E and going into the framework of the side, the sides being on the outside of the bars E. The framework of the seat, back, sides and footrest should be constructed of wood or metal and should be substantially in the shape shown in the various drawings, though the shape of each, particularly the sides, may be varied to suit any taste. The covering for the seat, back, sides and foot-rest may be of ratan, leather or similar materials.

Describing the exact construction of the frame elements of the go-cart, it will be seen that at each side two main side bars D and C are provided, said bars being pivotally connected together intermediate of their ends, as at 9, the bar C having pivotal connection with the front axle of the go-cart at the point indicated at 1, and the bar D having a similar connection with the rear axle at the point indicated at 2. It will, of course, be understood that suitable supporting wheels, indicated in outline in the drawing, are applied to the axles of the go-cart. Pivotally connected at the lower ends thereof with the main side bars D are the upwardly extending spaced bars B to which are pivoted the sides of a handle A by which the go-cart is pushed or otherwise moved when in actual use. The handle A in general form is substantially the same as those most commonly in use having a transverse handle-bar at its upper extremity connecting the sides thereof. The function of the handle A in the present go-cart construction is peculiar and particularly advantageous. The sides of said handle virtually constitute levers, the lower end portions of which are pivoted at 7 to the upper portions of the side bars C, this admitting of movement of the handle forwardly or rearwardly relatively to the foot-rest at the front of the carriage. The points of connection of the sides of the handle A with the bars B are situated a short distance from the pivotal points 7 and the latter constitute fulcrums for the handle, in an obvious manner.

The body frame of the go-cart or vehicle includes not only the bars C and D before described, but the spaced bars E, the front ends of which are connected with front bars F, and the rear ends of which are pivotally attached at 10 to the upper extremities of the main side bars C. It may be stated here that the main side bars C curve upwardly at their rear end portions to admit of pivotal connection thereof with the several parts hereinbefore described as attached thereto. The side bars E have the wicker or ratan side pieces of the go-cart secured thereto in a substantial way as will be readily apparent by reference to the drawings.

Rigidly attached to the bars B at the upper portions of the latter are toothed segments N and also pivoted to the bars B intermediate of the ends thereof are short plates M to which the back of the go-cart is rigidly secured by substantial fastenings. Centrally of and longitudinally arranged, relative to the back of the go-cart, is a latch rod O provided at its upper end with a suitable hand-piece, the lower extremity of said latch rod being connected with a transverse bar P, the opposite extremities of which project laterally from the side edges of the back, a short distance, the projecting extremities of the member P being adapted to engage in the notches or toothed portions of the segments N in order to hold the back of the go-cart at a desired adjustment either in an approximately vertical position, a downward horizontal position or at an intermediate adjustment. The end portions of the member P are pivotally connected by links Q with the plates M in an obvious manner. A spring R interposed between a bracket member s applied to the back of the go-cart on its rear side and near the top portion thereof, and an enlargement on the rod O, normally tends to effect engagement of the member P with the notched portions of the segments N.

The seat of the go-cart is secured to side members H which have pivotal connection at 8 with the main side bars C and similar connection with the front bars F and the short bars G by which the seat is connected at the points 12 with the upper front extremities of the main side bars D. The various pivotal connections established between the side bars comprising the body frame of the carriage admit of collapsing or folding movements of these parts whereby the whole body frame is adapted to be dropped into a position between the front and rear axles, or between the front and rear wheels, to reduce the size of the go-cart in order to economize space when the article is not in use, and to facilitate transportation of the same.

The invention involves the broad idea of reducing the size of the go-cart or carriage, for the purposes hereinbefore premised, by so connecting the elements of the body frame as to permit of the collapsing or folding movement thereof to assume positions between the front and rear wheels by a lowering movement.

Furthermore, the invention involves broadly the idea of utilizing the handle A which is peculiarly connected with the body frame as described specifically hereinbefore, as a means for effecting positive actuation of the body frame to collapse the latter in the manner set forth. The handle A virtually constitutes a lever device for operating the body frame to accomplish the desired result, the action of the handle being illustrated in the drawings.

Normally the handle A of the go-cart is held in an upright position by engagement of catches U with the lower extremities of the sides of said handle. The catches U are pivoted at their front ends at 5 to the side or seat bars H which are secured substantially to the seat of the go-cart and said catches are formed at their rear extremities with lateral extensions adapted to engage the lower extremities of the handle sides as above mentioned. Said lower end portions of the sides of the handle are inwardly offset and the lower extremities are beveled or cut away from the front edges on a curved line so as to permit of automatic engagement of the handle sides with the catches U when the handle is moved rearwardly into its normal position assumed thereby when the carriage is in use. The catches U are released or disengaged from the sides of the handle A by proper manipulation of a transverse handle-bar T arranged beneath the seat and having an intermediate handle portion. Said handle-bar has its ends secured substantially to the catches U and vertical pins projecting downwardly from the under side of the seat pass through opposite end portions of the said handle bar T. Springs W are interposed between the under side of the handle-bar T and heads V at the lower extremities of the pins aforesaid and these springs normally tend to hold the catches U in engagement with the lower extremities of the sides of the handle A.

The foot-rest at the front of the go-cart is adapted for adjustment in the usual manner, a bracket I projecting from the under side of the foot-rest and being pivotally secured to an adjusting bar J, the rear end portion of which is notched to engage with a stirrup L, a hook K being provided at the rearmost extremity of the bar J.

In effecting collapsing movement of the go-cart, the handle A is moved forwardly until it assumes a position flat upon the cart structure, the back of the carriage, of course, having been previously pushed forward and dropped until it rests upon the seat, in the manner indicated very clearly in one of the figures of the drawing. When the handle is at its lower limit of movement the body frame of the go-cart will have been collapsed until it occupies a position between the front and rear axles and the transverse handle-bar of the handle A will be arranged proximate to the front wheels of the carriage or go-cart and will form a rest coöperating with said front wheels to support said carriage, when the latter is turned upon its front end. The handle A not only performs the function of an actuating means for the body frame, but it constitutes a rest for supporting the carriage or go-cart when the latter is collapsed and out of use and stood up end for end. This latter structure is very desirable as the rest constituted by the handle A is such that the go-cart will not be free to move readily, when collapsed, a disadvantageous feature of that type of go-carts which are collapsed by upward movement of the body frame and which are supported on the front and rear wheels, when in collapsed condition.

A feature of importance presented by this invention resides in the provision of a rigid seat and back for the carriage, in connection with the collapsible body thereof. It is extremely desirable in go-carts and carriages of the type presented in the present invention that the back of the infant has a non-yielding support in order to insure perfect safety and to avoid spinal troubles such as might rise from the use of a flexible seat.

It will be apparent from the foregoing description that the rigid seat and back of our invention are peculiarly mounted upon the frame structure of the go-cart in order to admit of the folding or collapsing of the latter in the manner described. The rear ends of bars D may be twisted and turned as is shown by the dotted lines in Figs. 1 and 4 of the drawings so as to form springs for the entire body of the cart.

It will be apparent that when the go-cart comprising this invention is collapsed, by forward movement of the handle A, the same will readily constitute a bed to hold an infant in recumbent position, and under such conditions the back of the cart will, of course, be adjusted so that it extends rearwardly from the seat into an almost horizontal position.

The catches U when coöperating with the handle A to hold the latter in an upright position, perform the function of a locking mechanism for holding the body frame of the go-cart in operative condition.

The present invention represents a very desirable article from the commercial standpoint for reasons which will be apparent from the foregoing description.

Having thus described the invention, what is claimed as new is:—
1. As a new article of manufacture, a collapsible go-cart designed to be stood on end when collapsed, and comprising in combination, a body composed of a seat, sides, and a back therefor, supporting wheels, main side bars connecting the body with the supporting wheels, means for normally supporting the body in a position above said wheels and means for effecting collapsing movement of the body and side bars aforesaid to cause these parts to assume positions between the wheels of the go-cart and comprising a rest co-acting with the wheels to support the go-cart on end, when collapsed.

2. As a new article of manufacture, a go-cart of the type described designed to be stood on end when in collapsed position and comprising in combination, a seat, sides, and a back therefor, supporting wheels, pivotally connected side bars connecting the body and the wheels and normally supporting the body above the wheels, and a handle for the go-cart connected with the main side bars aforesaid to collapse the cart, and comprising a rest co-acting with the wheels to support the go-cart on end when collapsed.

3. As a new article of manufacture, a go-cart of the type described, designed to be stood on end when in collapsed position and comprising in combination, a seat, sides, and a back therefor, supporting wheels, pivotally connected side bars connecting the body and the wheels and normally supporting the body above the wheels, a handle for the go-cart connected with the main side bars aforesaid to collapse the cart, and comprising a rest co-acting with the wheels to support the go-cart on end when collapsed, and means admitting of adjustment of the back of the go-cart independently of said handle.

4. A collapsible go-cart designed to be stood on end when in collapsed position and comprising a body, supporting wheels therefor, main side bars connecting the body and the supporting wheels and adapted to fold in collapsing the go-cart, and means for effecting positive folding movement of the side bars to cause the body to assume a position between the wheels of the go-cart, the body of the go-cart including a back mounted thereon and adjustable independently of the last mentioned means.

5. In a collapsible go-cart of the type described, designed to be stood on end when collapsed, the combination of supporting wheels, a body normally supported above said wheels, a member for collapsing the go-cart to cause the body to assume a position between the wheels and comprising means co-acting with certain of the wheels of the go-cart as a rest to support the go-cart on end when it is collapsed.

6. In a collapsible go-cart, the combination of supporting wheels, a body comprising a seat and sides, a handle, main side bars pivotally connecting the wheels with the body, and foldable in collapsing the go-cart, bars arranged at the rear portion of the cart and connecting said handle with the rear ends of certain of the main side bars, means pivotally connecting the handle with other of the main side bars whereby movement of the handle will effect collapsing of the go-cart, and means normally holding the handle in such a position that the body of the go-cart is supported above the wheels.

7. In a collapsible go-cart, the combination of supporting wheels, a body comprising a seat and sides, a handle, main side bars pivotally connecting the wheels with the body, and foldable in collapsing the go-cart, bars arranged at the rear portion of the cart and connecting said handle with the rear ends of certain of the main side bars, means pivotally connecting the handle with other of the main side bars whereby movement of the handle will effect collapsing of the go-cart, means normally holding the handle in such a position that the body of the go-cart is supported above the wheels, and a back for the go-cart adjustably mounted thereon and adjustable independently of the handle.

8. In a collapsible go-cart, the combination of axles a pair of supporting wheels mounted on each of said axles, a body comprising a seat, sides, and a back, main side bars supporting the body and pivotally connected at the lower ends thereof with the front and rear axles, a pair of the main side bars extending rearwardly and upwardly at the rear portion of the cart, a handle for the cart having pivotal connection with the rear upwardly extending ends of said side bars, members pivotally connecting the other main side bars with said handle, catches applied to the seat of the go-cart and normally coöperating with the handle to hold the same in a position in which the body of the go-cart will be above the supporting wheels, and means for releasing said catches from the handle, the body of the go-cart including a back adjustable independently of the handle.

9. In a folding go-cart, designed to be stood upon end when in folded or collapsed position, the combination of front and rear supporting wheels, a body normally supported thereon in a position above said wheels, means for collapsing the go-cart so that the body thereof occupies a position between the several wheels, a back for the body of the cart mounted thereon, and means admitting of adjustment of said back when the go-cart is upright or collapsed, whereby the go-cart may constitute a bed for the infant when it is in collapsed position.

10. In a collapsible go-cart, the combination of supporting wheels, a body consisting of a seat, sides, and a back, main side bars pivotally connected at the lower ends with the wheels, a handle pivoted at its lower end to the rearmost ends of a pair of said side bars, members pivotally connecting the other of the main side bars with the lower ends of the handle aforesaid, catches pivoted to the seat and normally coöperating with the handle for holding the go-cart in upright condition, means for simultaneously disengaging said members from the handle, and means for admitting of adjustment of the back independently of the handle, when the go-cart is either in upright or collapsed position.

11. In a collapsible go-cart of the type described, the combination of wheels, a body comprising a rigid seat, a rigid back, main side bars pivotally connected at the lower ends thereof with the wheels, means normally supporting the body of the cart above the wheels, means connecting the upper ends of the main side bars to the rigid seat, but permitting of collapsing movement of the side bars to cause the body of the cart to move downward between the wheels, and a handle for the cart.

12. In a collapsible go-cart, the combination of supporting wheels, a body comprising sides, a handle, main side bars pivotally connecting the wheels with the body and foldable in collapsing the go-cart, bars arranged at the rear portion of the cart and connecting said handle with the rear ends of certain of the main side bars, means pivotally connecting the handle with other of the main side bars whereby forward movement of the handle will effect collapsing of the go-cart, means normally holding the handle in such a position that the body of the go-cart is supported above the wheels, side members having pivotal and link bar connections with the main side bars, and a rigid seat secured to said side members, substantially as described.

JOHN WOLFENDEN.
JOHN KNUTSON.
LEWIS LARSEN.

Witnesses as to John Wolfenden:
A. W. HAINTER,
CHAS. J. BURR.

Witnesses as to John Knutson:
JAMES OLSEN,
PETER HANSEN.

Witnesses as to Lewis Larsen:
JNO. BRUNGARD,
KRIST. MATHISEN.